(12) United States Patent
Camara et al.

(10) Patent No.: US 7,162,053 B2
(45) Date of Patent: Jan. 9, 2007

(54) GENERATION OF METADATA FOR ACQUIRED IMAGES

(75) Inventors: Franc J. Camara, Redmond, WA (US); Andrew S. Ivory, Woodinville, WA (US); Vlad Sadovsky, Bellevue, WA (US); Po Yuan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/273,697

(22) Filed: Nov. 14, 2005

(65) Prior Publication Data

US 2006/0077461 A1 Apr. 13, 2006

Related U.S. Application Data

(62) Division of application No. 10/185,228, filed on Jun. 28, 2002.

(51) Int. Cl.
*G06K 9/00* (2006.01)
(52) U.S. Cl. .............. 382/100; 348/231.3; 348/333.02; 382/306; 707/102; 707/104.1
(58) Field of Classification Search ............. 348/231.2, 348/222.1, 231.3, 333.02; 382/190, 218, 382/224, 229, 100, 306; 707/102, 104.1
See application file for complete search history.

(56) References Cited

U.S. PATENT DOCUMENTS

| | | | |
|---|---|---|---|
| 6,115,717 A | 9/2000 | Mehrotra et al. | |
| 6,324,536 B1 | 11/2001 | Rofrano | |
| 6,405,198 B1 | 6/2002 | Bitar et al. | |
| 6,445,460 B1* | 9/2002 | Pavley | 358/1.15 |
| 6,501,911 B1 | 12/2002 | Malloy Desormeaux | |
| 6,523,046 B1 | 2/2003 | Liu et al. | |
| 6,741,996 B1 | 5/2004 | Brechner et al. | |
| 6,757,684 B1* | 6/2004 | Svendsen et al. | 707/10 |
| 6,768,816 B1 | 7/2004 | Hall, Jr. et al. | |
| 6,833,865 B1 | 12/2004 | Fuller et al. | |
| 6,877,134 B1 | 4/2005 | Fuller et al. | |
| 6,937,234 B1* | 8/2005 | Long | 345/418 |
| 6,947,954 B1* | 9/2005 | Cohen et al. | 707/104.1 |
| 6,972,828 B1* | 12/2005 | Bogdanowicz et al. | 352/38 |
| 7,010,144 B1* | 3/2006 | Davis et al. | 382/100 |
| 7,017,144 B1* | 3/2006 | Cohen et al. | 717/100 |
| 7,020,330 B1 | 3/2006 | Schroder et al. | |
| 7,092,966 B1* | 8/2006 | McIntyre | 707/104.1 |
| 7,123,816 B1* | 10/2006 | McGrath et al. | 386/95 |
| 7,127,164 B1* | 10/2006 | Parulski et al. | 396/287 |
| 2006/0077461 A1* | 4/2006 | Camara et al. | 358/1.15 |

* cited by examiner

Primary Examiner—Gregory Desire
(74) Attorney, Agent, or Firm—Lee & Hayes, PLLC

(57) ABSTRACT

A method and image data acquisition service arrangement are disclosed that facilitate standardizing the process of adding metadata to acquired image information downloaded from a connected image capture device to a computer system. An image acquisition service analyzes image information downloaded from the image capture device and renders new metadata values based upon applied analytical algorithms/filters. Thereafter, the image information and new metadata are rendered available to other processes that use the image information and new metadata.

5 Claims, 4 Drawing Sheets

GENERATION OF METADATA FOR ACQUIRED IMAGES

RELATED APPLICATION

This application is a divisional of and claims priority to U.S. patent application Ser. No. 10/185,228 filed on Jun. 28, 2002, the disclosure of which is incorporated by reference herein.

BACKGROUND

Image metadata accompanies image data stored within an image file and provides information about the image data. Examples of image metadata, in the context of a digital camera, include focal length, aperture, copyright information, and number of pixels. Some metadata values, such as focal length and aperture, are generated at capture time. Other metadata values, such as copyright information, author information, etc., may be generated by users at image acquisition time or a later time.

The different types of metadata, stored within a header field of an image file, facilitate organizing and managing image data. In particular, the header field/portion of an image file is modified to render descriptive information about the image. In fact, some image file formats include a header field that supports entry of arbitrary data. Such a location is potentially available to store additional metadata through the use of a header editor. Thereafter, an image file management utility reads the image file metadata and filters and/or organizes the image files for users based upon specified search/organization criteria. Thus, image metadata, when combined with such an image file management utility, can prove highly valuable in efforts to organize a large quantity of image files. However, the descriptive metadata that facilitates such organization efforts is potentially entered in a variety of non-standardized manners by a variety of users. In the absence of a consistent metadata rendering scheme, the ability of image file filtering/organizing utilities to present a set of saved image files in an organized manner is significantly limited.

SUMMARY

In view of the shortcomings of the prior known methods for rendering metadata for image information, a method and system are disclosed that render image metadata and integrate the metadata into an image data structure (e.g., a file) contemporaneously with image information acquisition from an externally connected memory such as the memory of an image capture device.

More particularly, the method for generating metadata is based upon image information provided by an image capture device. The method is generally invoked in response to receiving a request to acquire image data that is stored within an image capture device that is connected to a computer system via a data transfer interface. Thereafter, the computer system data transfer interface acquires the responsive image data. Upon receiving the acquired image information, rather than merely storing the image information, the image information is analyzed by an image data analysis component to render at least one new metadata value for the image file. The new metadata value is integrated with the acquired image information.

The invention is further embodied in a new image data acquisition framework for generating, by a computer system at acquisition time, new metadata corresponding to acquired image data. The new image data acquisition framework includes a computer system data communication hardware interface for receiving the image data. A driver associated with the data communication hardware interface obtains image information from the hardware interface.

The framework also includes an image acquisition service including an image analysis component. The image acquisition service is interposed between a user mode process that initiated the acquisition by rendering a request, and the driver. The image acquisition service renders new metadata values from the information extracted from the image information obtained by the driver and integrates the new metadata values with the image information.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

The invention concerns generating metadata for image information, and more particularly a method and system for dynamically generating and integrating metadata into images at acquisition. Acquisition, as used in the disclosure of embodiments of the invention herein, refers to obtaining, by a local computer system, image information previously generated by a capture device. A diverse set of capture devices can operate as the originating source of image information including digital cameras, scanners, framers etc. Thus, the type of device that originates the acquired image information should not be construed to limit the scope of the term acquisition. Furthermore, the diverse set of capture devices provide image information in a variety of formats including both finished files, image bands, delimited streams (unfinished files), etc.

The acquired image information is generally received via a communication driver on the local computer system. Furthermore, in the context of the invention, different externally connected sources of the image files potentially communicate via different hardware communication interfaces, such as, by way of example but not limited to, serial/parallel port, SCSI drive, and/or universal serial bus interfaces. Thus, the hardware interface through which image information is acquired by a computer system varies in accordance with a broad variety of embodiments of the invention.

In an embodiment of the present invention, a local computer implements a set of steps described herein for generating and integrating metadata into image files as they are acquired by the local computer system. An exemplary local computer system executing program modules embodying the present invention is described herein below.

Figure 1:
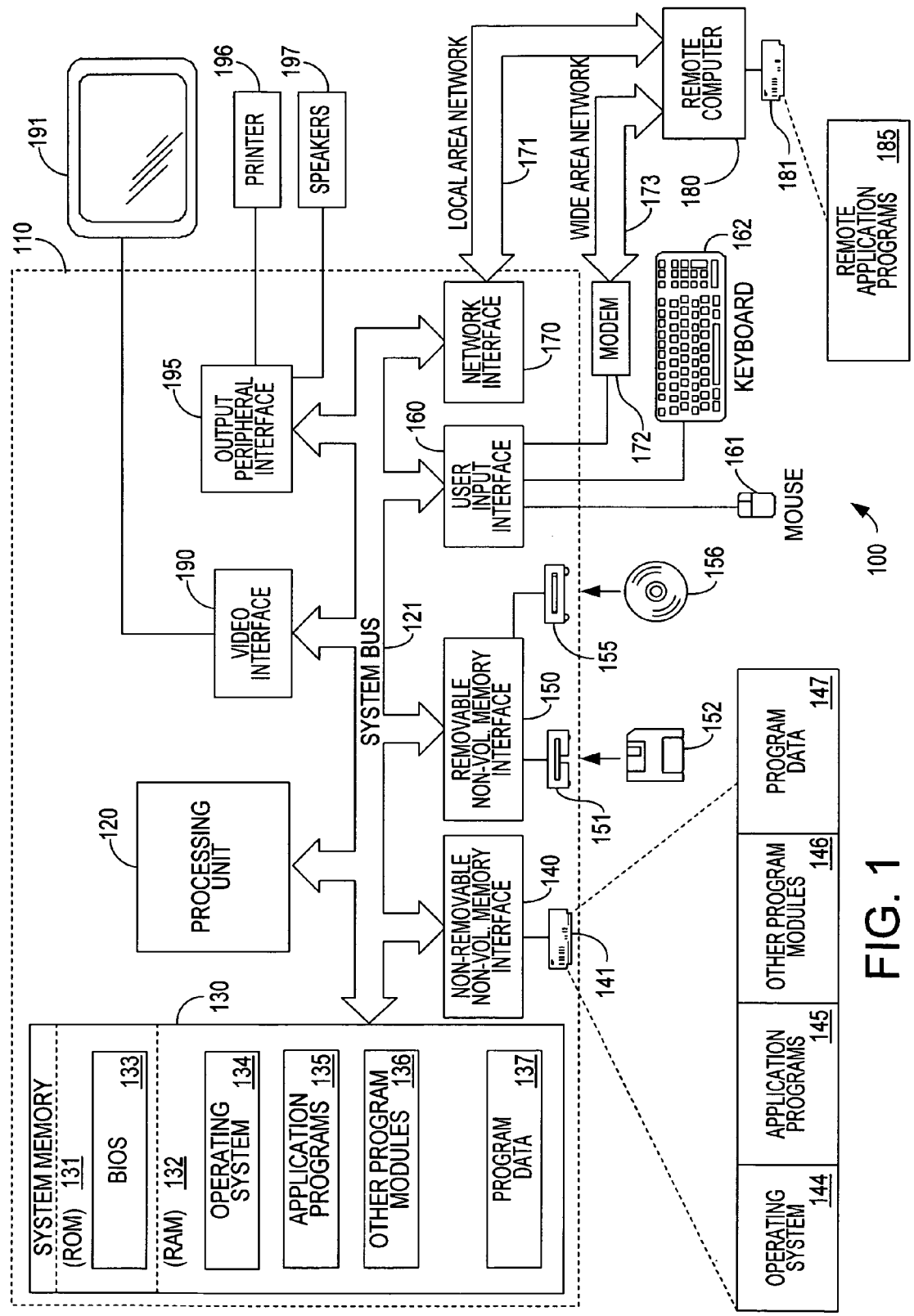
FIG. 1 is a block diagram depicting an exemplary computer system for carrying out an embodiment of the invention.

FIG. 1 illustratively depicts an example of a suitable operating environment 100 for carrying out creating and integrating metadata for image information as it is acquired from an externally connected device transmitting captured image data. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both, volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
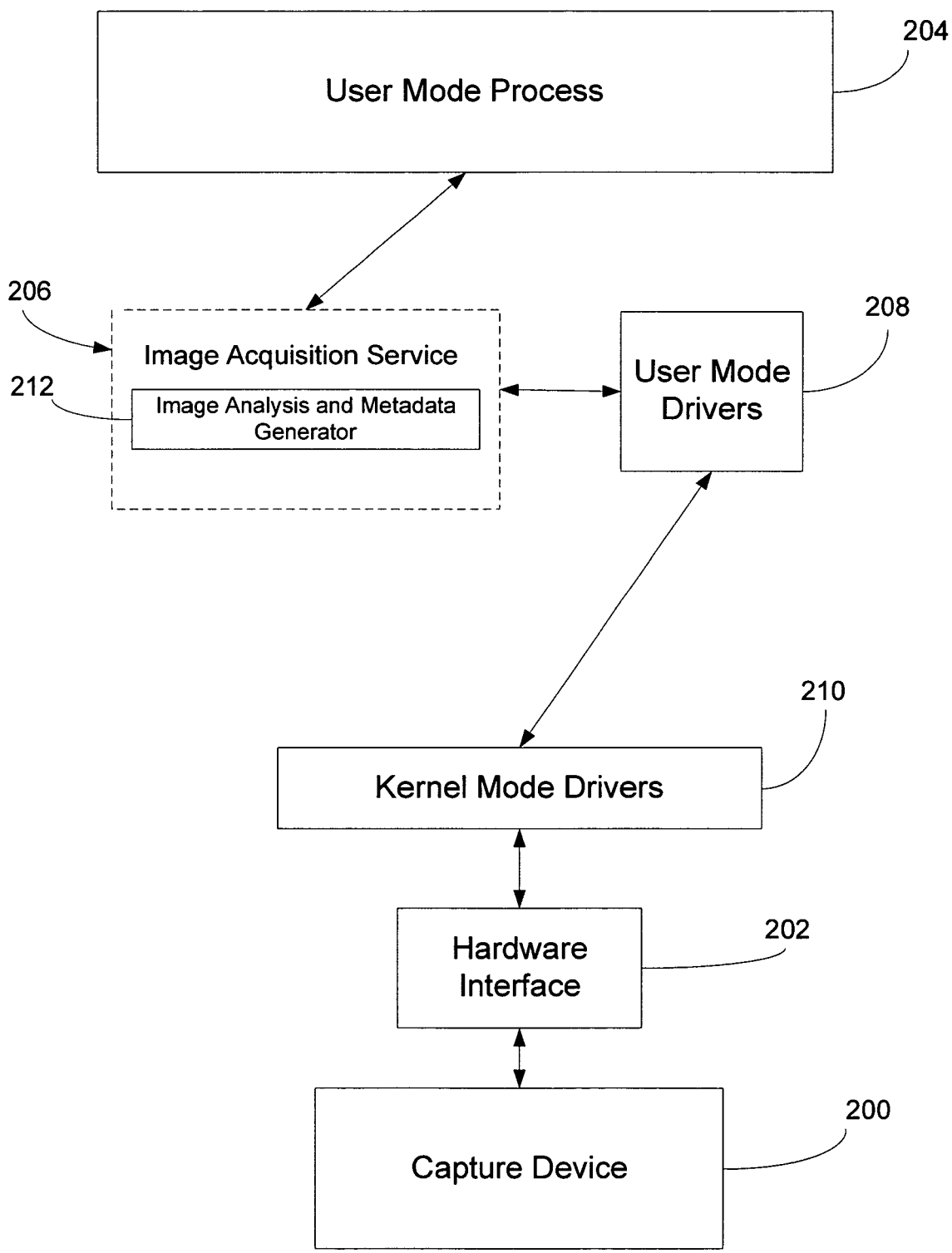
FIG. 2 is a high level schematic diagram depicting the primary components of a system for carrying out an embodiment of the present invention.

FIG. 2 is a high level schematic diagram identifying components of an exemplary system for carrying out the present invention. In an embodiment of the invention, an image capture device 200 initially creates image information. The image capture device 200 is, by way of example, a digital camera that creates image information and stores the images as a set of files. However, the present invention is applicable to image information rendered by any type of device including scanners that stream image data rather than packaging the image data as an image file.

After capturing a number of images, a user downloads the image data, stored for example as a set of files, from the memory of the capture device 200 to the computer 110. Such download is generally facilitated by first communicatively linking the capture device 200 to a hardware interface 202 provided on the computer 110. As mentioned previously herein the type of hardware interface 202 is not limited to any particular type. In various exemplary embodiments, the hardware interface 202 is a USB, parallel, serial, or SCSI interface. Other types of hardware interfaces will be known to those skilled in the art.

The acquisition process itself does not rely upon any particular hardware—it is independent of the hardware. Thus, in yet other embodiments of the invention, captured image files are acquired from a remote storage location via a network link. By way of example, the images are acquired from the internet. It is contemplated that, in such embodiments, users connect to an online photo service and "acquire" images from the site to the local machine. If desired, the metadata analyzer or creator is capable of being plugged into the network-related workflow.

In an embodiment of the invention a user mode process 204, such as a digital image viewing/management application including a graphical user interface, executes upon the computer 110. An example of such an application is the "Scanner & Camera Wizard". However, in embodiments of the invention, traditional applications, such as Microsoft PictureIt leverage the image analysis and metadata rendering capabilities described herein through APIs. The user mode process 204 provides high-level command control for a user. One such contemplated command is an image file acquisition command, submitted to an image acquisition service 206, that invokes the computer 110 to acquire one or more image files from the communicatively coupled capture device 200. The image acquisition service 206, in an embodiment of the invention, is part of the operating system of the computer 110. However, in alternative embodiments of the invention, the image acquisition service 206 is an application program.

In an exemplary embodiment of the invention, the image acquisition service 206 comprises a set of modules providing a generic interface between the user mode process 204 and lower level drivers (e.g., user mode driver 208 and kernel mode driver 210) that carry out protocol-specific steps corresponding to the high level requests submitted by the user mode process. The exemplary image acquisition service 206 handles all image transfers from imaging devices to requesting user mode processes (e.g., process 204).

Furthermore, the image acquisition service may be activated in different ways. In one embodiment, the image acquisition service 206 always runs and constantly listens for acquisition invoking events associated with external device hardware interfaces and image data transmissions. Listening entails the image acquisition service 206 waiting on particular events. Thus, other applications and processes need not be aware of the presence of the image acquisition service 206 and its image metadata generation capabilities. However, in cases where the image acquisition service 206 does not recognize a particular event, the image acquisition service 206 is activated by a call to its interface (including possible a set of passed parameters indicating the specific metadata value types that should be rendered). For example, a separate application invokes only the image acquisition service components that render author and date metadata.

In response to requests from the user mode process 204, the image acquisition service 206 negotiates with the user mode driver 208 to acquire the requested image files from connected devices (e.g., the capture device 200) the desired files. The user mode driver 208 thereafter communicates directly with the kernel mode driver 210 to request low-level hardware-interface-specific data acquisition services. In response, the kernel mode driver 210 communicates with the attached capture device 200 according to a particular hardware protocol to download the requested image files from the capture device via the hardware interface 202. After receiving the requested image file data, the kernel mode driver commences passing the requested image file data back to the user mode driver 208. The user mode driver 208 thereafter passes the image file data to the image acquisition service 206.

One of the aims of the disclosed image acquisition service is to standardize metadata for all image files stored on a local computer system. In an embodiment of the invention, the image acquisition service 206 exploits its positioning between the source of image file data (i.e., the capture device 200) and the user mode process 204 to invoke an image analysis and metadata generator component (image analysis component) 212. The image analysis and metadata generator component: (1) analyzes the content of the image information acquired from the capture device 200, (2) generates one or more new metadata values, and (3) integrates the new metadata values into an image file. An exemplary retrieved image file format is an EXIF format, and the generated metadata is stored, by way of example, as a blob of tagged XML data within the file header—though other suitable file header formats are contemplated in alternative embodiments of the invention. Furthermore, the present invention is not limited to any particular image file format and alternative formats include, by way of further example, JPEG and TIFF file formats. Also, the illustrative embodiment operates within an image acquisition utility. However, in alternative embodiments, the spectrum of "acquired" image information intercepted and processed by the image acquisition service 206 extends to files transferred onto the local computer (containing the image acquisition service 206) from outside sources, other than locally connected image capture devices. Such outside sources include non-locally connected image capture devices and non-locally stored image files retrieved via a network interface.

After generating the XML metadata and inserting it within the image file header, the image acquisition service 206 passes the modified image file to the user mode process 204. By handling all acquired image files before they pass to a requesting user mode process, the image acquisition service 206 ensures that all the acquired image files contain a consistent/standardized set of metadata values.

The image analysis component 212, described in more detail herein below with reference to FIG. 4, comprises an extensible set of algorithms (also referred to as filters) for generating particular types of metadata describing an acquired image file. In an embodiment of the invention the extensibility of the set of metadata generation algorithms/filters is achieved by implementing the algorithms as a set of DLLs. The algorithm DLLs are registered as a particular class recognized by the image acquisition service 206. When the image acquisition service 206 is instantiated during startup, it loads all registered DLLs containing the metadata generation algorithms. Alternatively, the algorithms are embodied within plugins that are suitable for the data flow arrangement depicted in FIG. 4. In an embodiment of the invention, a user control is provided enabling a user to selectively enable/disable particular ones of the set of metadata generation algorithms.

The image analysis component 212 generates a variety of metadata based upon an extensible set of image file algorithms/filters. The algorithm/filter types comprise two general classes based upon the information that they utilize to render a metadata value: (1) ones requiring analysis of the image rendered by the data, and (2) ones that do not require image data analysis. With regard to the first class, the image analysis component 212 interprets the image content of the image file and thereafter renders a characteristic value based upon a particular algorithm/filter specified in the set enabled by the image analysis component 212. The second class of algorithms/filters either provide information from existing metadata in a consistent form (for all image files passing through the image acquisition service 206), or supplement the metadata of the image file with new types of metadata.

The algorithms/filters of the image analysis component 212 comprise both interactive and non-interactive metadata generators. In the case of interactive metadata generation algorithms, the image acquisition service 206 prompts a user to supply information relating to an image file or group of image files. Interactive mechanisms include by way of example: grouping image files temporally and prompting a user for a topic and/or key words associated with the group, and detecting faces in an image and prompting a user for the subjects' identities. Non-interactive mechanisms, often incorporating image recognition algorithms, include by way of example: detecting from a background whether an image was captured in an indoor or outdoor setting, detecting from a background whether a picture was taken in a particular environment (e.g., urban setting, country setting, forest, field, etc.), detecting a type of picture including a person (e.g., a portrait, a group, a crowd), and identifying a particular person based upon a previous set of identification/recognition information. The types of interactive and non-interactive metadata generation algorithms and/or filters is unlimited and is extended by creating and installing new DLL files and incorporating them at the time the image acquisition service 206 is instantiated, for example, by a call by the user mode process to download data from the capture device 200 or when the computer system 110 starts up.

The above-described example depicts an arrangement wherein image files are retrieved directly from an image capture device. However, the present invention is not limited to extractions from such devices. Embodiments of the invention also include the ability to process image files retrieved via a network interface. In an embodiment of the invention, a network file transfer utility invokes the image acquisition service 206 to process a retrieved file recognized by the system to be an image file (based upon the file extension). In general, there are many ways to retrieve an image file from a variety of image file storage locations. The locations and methods for retrieval identified herein are exemplary and should not be construed as limiting the scope of the invention.

Figure 3:
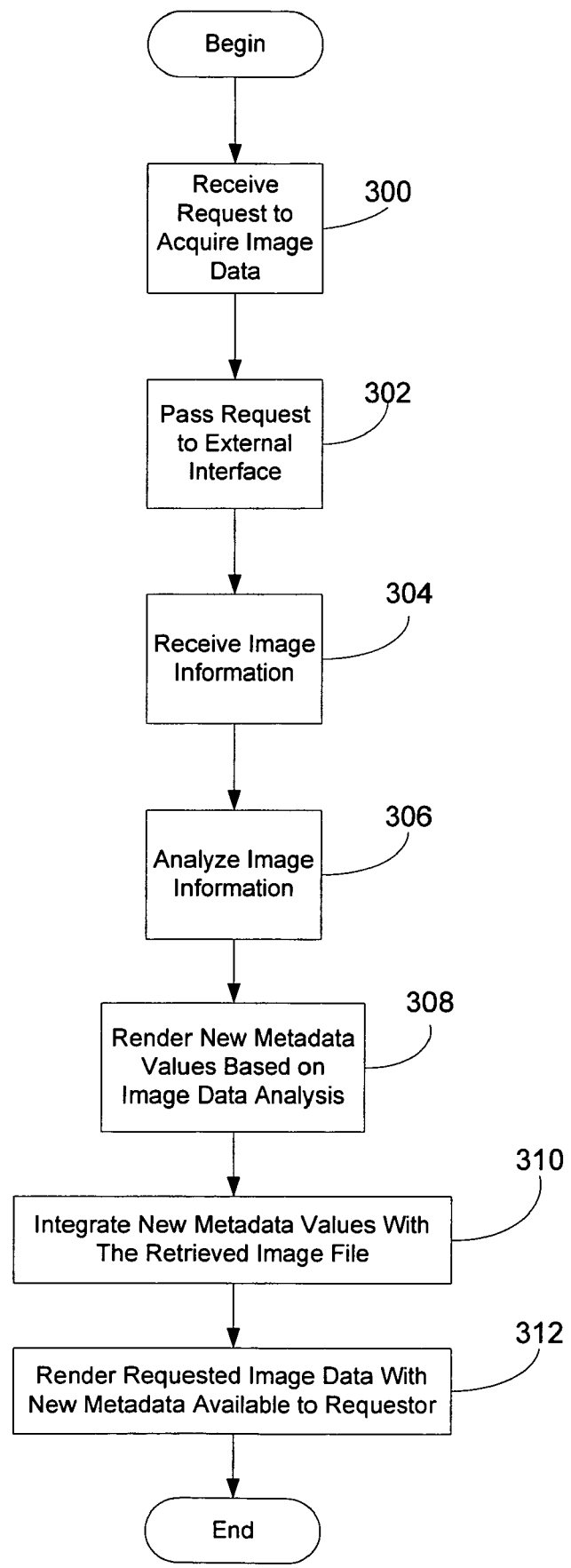
FIG. 3 is a flow chart summarizing an exemplary set of steps involved in rendering metadata from an acquired image file.

Having described an exemplary architecture for carrying out image file acquisition in accordance with an embodiment of the present invention, attention is now directed to FIG. 3 that summarizes a set of exemplary steps for generating and integrating metadata into an acquired image file. During step 300, the image acquisition service 206 receives a request from the user mode process 204 to acquire image data. By way of example, the user mode process 204 requests download of a set of EXIF files from the connected capture device 200 during step 300. However, the source is not limited to providing image data of a particular type or format. The disclosed metadata generation method applies to streaming data (from devices that generate acquisition source data while scanning a field of view) and files containing image data. An example of streaming data is a scanner that transmits a stream of data from which an image is constructed during acquisition. The streaming data includes live tethered camera feeds. Furthermore, the request needs not originate with the user mode process 204. In alternative embodiments, the connected device 200 initiates the download of the image data. In yet other embodiments, the image acquisition service receives the request to acquire image data from a kernel-mode process.

Upon receiving the request, during step 302 the image acquisition service 206 passes the request to an external interface to initiate the acquisition of the requested image data. In the illustrative embodiment, the image acquisition service 206 communicates the request to kernel mode drivers 210 that interface the hardware interface 202. However, a variety of ways are contemplated in which the image acquisition service 206 communicates requests to an appropriate hardware interface (including a network interface). For example, in alternative embodiments the image acquisition service 206 communicates with the kernel mode drivers 210 directly rather than through user mode drivers 208. Still, other ways will be known to those skilled in the art.

Once the image acquisition service 206 passes the request to the hardware device, it waits upon the drivers 208 and 210 to acquire the requested image data and begin delivering it to the image acquisition service 206. Carrying out the actual acquisition of the image data is hardware and interface protocol-specific and can occur in any of a variety of manners that will be known to those skilled in the art. Such connections include both locally connected and networked data sources.

At step 304 the image acquisition service 206 commences receiving the requested image information. The receiving step 304 includes buffering the acquired image information for processing by the image analysis component 212 during step 306. The buffered image information is later augmented with metadata rendered during step 308 before presenting the received image information to a user mode process during step 312. While certain embodiments receive image data in the form of files (e.g., EXIF files), the present invention is not limited to such embodiments. In addition to handling a variety of input file formats (and image data formats within the file formats), the present invention is applicable to streaming input data. Such streaming data includes at least data that is acquired before it is packaged in a finished file. An example of streaming data is scanner data. It is further noted that in cases where multiple images are provided in response to a single request, the subsequent steps can commence as soon as the image acquisition service receives an image unit.

Steps 306 (image analysis) and 308 (metadata generation) are described in detail with reference to FIG. 4. However, in summary, upon receiving image information responsive to the image acquisition service's earlier request, the image analysis component 212 applies analytical algorithms/filters during step 306 to render a set of characteristics. In a particular embodiment of the invention, prior to applying analytical algorithms/filters to the image data, the received image data passes through a decoder that converts input from a variety of supported input image data formats (e.g., TIFF, JPEG, etc.) to a single generic format utilized by the image analysis component 212 to render the set of characteristics. In an embodiment of the invention, the generic image data is discarded after it has satisfied its function of providing input for image metadata generators.

Examples of the analytical algorithms/filters have been described herein above with reference to the image analysis component 212 and will not be repeated here. However, it is reiterated that the set of algorithms/filters potentially comprise virtually any desired type of analysis including ones based upon: interaction with a user, non-interaction with a user, the pre-existing metadata/header information accompanying image data, and the generic bitmap image information rendered by the decoder. In an embodiment of the invention, the extensibility of the set of algorithms/filters is obtained by enabling the image acquisition service 206 to instantiate at least an extensible portion of the set of algorithms/filters from DLLs or plugins when the image analysis component 212 is readied for operation.

In embodiments of the invention, particular analytical algorithms/filters of the image analysis component 212 are selectively activated before executing the steps of FIG. 3. The specific algorithms/filters are designated, by way of example, using a graphical user interface check box in a properties page for the image acquisition service 206. In an embodiment of the invention a "self-learning process activates/deactivates algorithms based upon specified criteria. Thereafter, during steps 306 and 308 the selectively activated analytical algorithms/filters are applied and metadata is generated based upon the designations.

At step 308, the image analysis component 212 generates metadata based upon the set of characteristics rendered by the image analysis step 306. In an embodiment of the invention the new metadata is provided, by way of example, in the form of XML tagged data that is interpreted by an appropriate image file organization/filtering utility according to a pre-defined schema. However, those skilled in the art will readily appreciate the wide variety of different forms with which one may represent the new metadata.

During step 310 the new metadata rendered during step 308 is integrated with an image data storage structure (e.g., a file) that contains the image information received during step 304 and processed during step 306. In an embodiment of the invention, during step 310 the new metadata items are added to an acquired image file from which analyzed image information was obtained. For example, in a particular embodiment of the invention, the metadata is stored in the form of a tagged XML blob in an EXIF image file header.

However, in alternative embodiments of the invention the new metadata (e.g., descriptive key words characterizing the image file) is stored separate from the image file with which it is associated and appropriate logical links are created to integrate the new metadata with corresponding image file data from which the new metadata was rendered. For cases where the application seeking to display the image does not support metadata, such as BMP files, an embodiment of the invention outputs a list of metadata values that can be saved in a known storage location. Thus, the image metadata generation methods, described herein, are available to imaging applications without regard to whether the image file format supported by the application includes metadata.

It is noted that applying a set of designated algorithms/filters to an image file will often result in rendering multiple new metadata elements. As those skilled in the art will readily appreciate, rendering and even integrating metadata can occur at any point after a corresponding analytical algorithm/filter is applied to the image information. With regard to each individual piece of metadata, steps 308 and 310 can occur immediately after applying an analytical algorithm/filter to render a particular characteristic for the received image information during step 306.

In an embodiment of the invention, after generating the metadata and inserting it within the image file header (or performing an equivalent logical integration step), during step 312 the image acquisition service 206 passes the augmented image file, including the added metadata, to the user mode process 204 or alternatively stores the augmented file in a designated directory location. By handling all acquired image files before they are passed to a requesting user mode process, the image acquisition service 206 ensures that the acquired image files contain a consistent/standardized set of metadata values.

Figure 4:
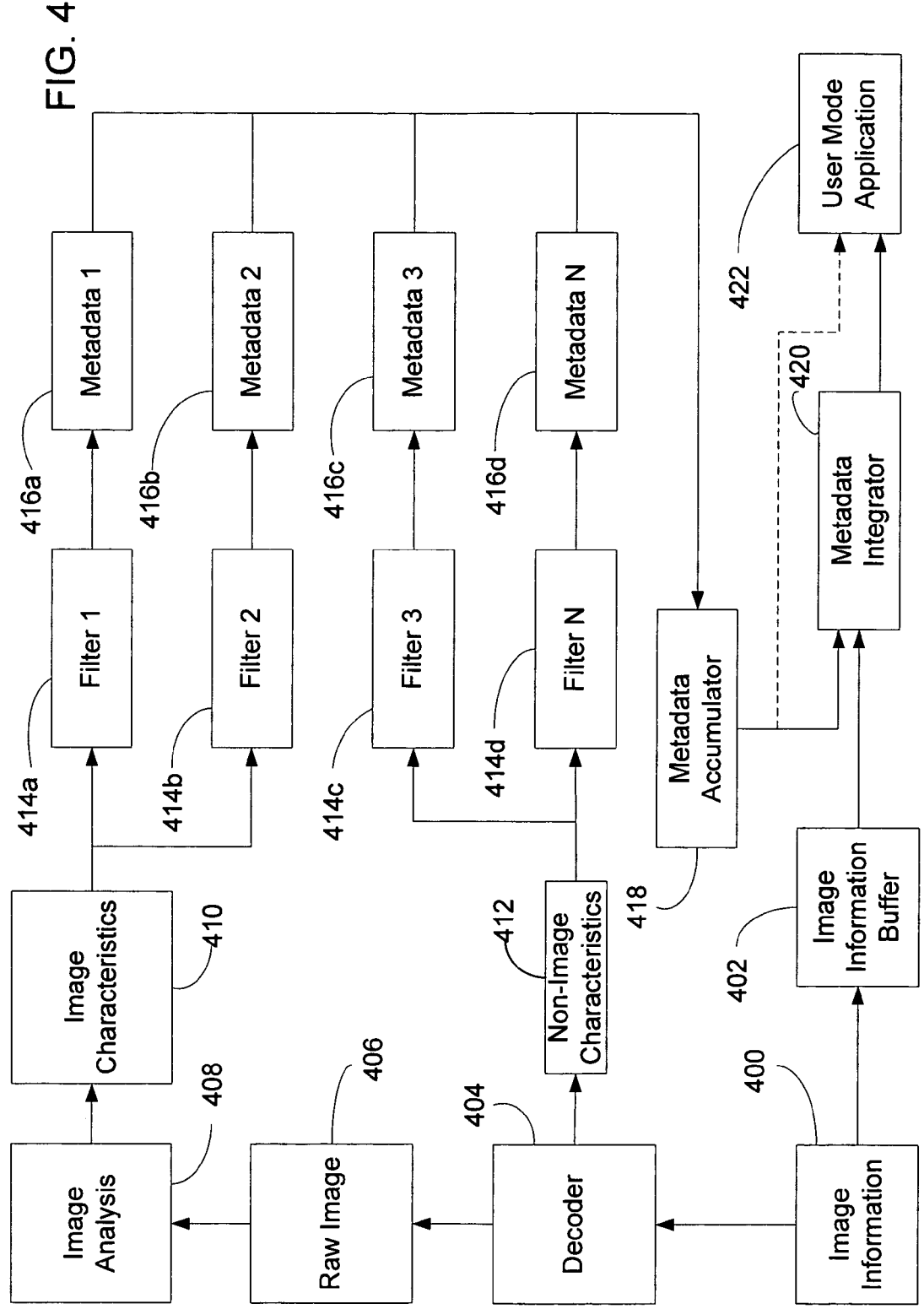
FIG. 4 is a data flow diagram depicting an exemplary image file data processing scheme carried out by an image acquisition service in accordance with an embodiment of the present invention.

Turning now to FIG. 4, a data flow diagram depicts an exemplary arrangement for processing received image data in accordance with the analysis step 306 and metadata generation step 308 described herein above. As those skilled in the art will readily appreciate in view of the disclosure herein, there are many ways in which to carry out applying a set of analytical algorithms/filters and rendering one or more new metadata values based upon the analysis. Thus, the examples contained herein are merely examples of how to carry out the functionality of steps 306 and 308 described herein above.

Initially image information, identified at block 400, is provided to the image analysis component 212. The image information, as explained above, comes in a variety of forms such as image files (e.g., EXIF, JPEG, TIFF, etc.) or streaming data having appropriate image frame delimiters. As depicted in FIG. 4, the image information takes two paths, a first path places the original image information within a buffer 402. Processing the buffered information is discussed herein below.

The image information is also passed along an image analysis path that commences at a decoder 404. The decoder 404 includes an extensible set of conversion modules that take input image data provided in a variety of formats and render generic raw bitmap image data (represented by block 406) for further processing by subsequent analytical modules in the image analysis component 212. The raw bitmap information can take any one of a number of forms including, by way of example uncompressed RGB pixel arrays at 24 bits per pixel (256 color) and 48 bits per pixel (16-bit color). However, other pixel representations (e.g., 24-bit true color) will be known to those skilled in the art. The decoder 404 reduces the complexity of subsequently applied modules since they need only support the image data format of the bitmap image data 406 rendered by the decoder 404. In an embodiment of the invention, the input format-specific conversion modules are supplied by an extensible set of dynamically incorporated files such as, by way of example, DLLs or plugins.

The raw bitmap image data 406 passes to an image analysis engine 408. The image analysis engine 408 applies an extensible set of analytical algorithms to the received raw bitmap image data 406 to render a set of image characteristics 410. The extensible set of algorithms comprise a variety of interactive and non-interactive procedures that extract meaningful traits from the image to facilitate organizing image files stored upon the computer 110 at a later time using a directory filtering/ordering utility.

The conversion modules of the decoder 404 also include non-image information decoders that analyze the header information or other non-image characteristics associated with one or more input files. The non-image information decoders execute analytical algorithms to render standardized metadata for all processed image files stored on the computer 110. Such standardized metadata includes time stamps, occasions, group identifications (not based on image information), focal length, etc. Such non-image information decoders comprise interactive and non-interactive processes. For example, an interactive process would be: prompting a user to supply an occasion for a group of temporally captured images (based upon timestamps on the captured/acquired files). An example of a non-interactive process is supplying a timestamp based upon the download date/time of an acquired file. The decoder 404 thus renders a set of non-image characteristics 412 for the acquired image information.

The image characteristics 410 and non-image characteristics 412 subsequently pass to a set of filters/metadata generators 414(a–d). Each one of the filters/metadata generators 414(a–d) renders a corresponding metadata value 416(a–d) of a particular type based upon input image and non-image characteristics 410 and 412 and a metadata generation criterion embodied within each of the filters/metadata generators 414(a–d). As mentioned previously herein above, in an embodiment of the invention, a user interface associated with the image analysis component 212 enables a user to selectively enable/disable one or more of the set of filters/metadata generators 414(a–d). The various types of generated metadata rendered by the filters/metadata generators, described by way of example above, are virtually limitless. In the modularized architecture proposed herein, incorporating new DLLs or plugins that embody new filters/metadata generators extends the set of rendered metadata. The new filters/metadata generators are thereafter incorporated dynamically when the image acquisition service 206 starts up.

The modularized image analysis component 212 and its alternatives described herein, are merely illustrative. As those skilled in the art will readily appreciate, the functionality of the image analysis component 212 can be carried out in many ways. For example, in an alternative embodiment, rather than having an image analysis engine 408 generate a set of characteristics for all filters, image analysis is integrated with particular generated metadata. Thus, when a new filter/generator type is added, the module containing the filter/generator also includes the analysis engine that renders the information needed by the filter/generator to render metadata of a particular type. Yet other embodiments include hybrids of the above-described module-based approaches.

The metadata values 416(a–d), in an embodiment of the invention, are received by a metadata accumulator 418. The metadata accumulator 418 groups the various types of metadata into a single blob comprising tagged XML data. Thereafter, the XML blob is provided to a metadata integrator 420. In an embodiment of the invention, the metadata integrator 420 includes at least two modes of operation. A first mode, for acquired image files containing a header capable of storing the XML blob, inserts the accumulated metadata rendered by the image analysis component 212 into the file header. A second mode, for acquired image files that do not contain a suitable storage location, stores the XML blob at a configured location within the computer 110 known to applications and utilities that are aware of the metadata generation facilities for acquired image information.

After augmenting the originally received image information with the rendered metadata, the requested image information is released and made available to a user mode application 422. Typically, the user mode application 422 was responsible for invoking the acquisition/metadata generation process that resulted in the augmented image information supplied by the metadata integrator 420. With reference to FIG. 2, the passage of data from the metadata integrator 420 to the user mode application 422 corresponds to a responsive communication from the image acquisition service 206 to the user mode process 204 that initiated an image data acquisition from the connected capture device 200.

It will be appreciated by those skilled in the art that a new and useful method and system for generating and applying new metadata to acquired image files has been described herein. In view of the many possible environments to which the principles of this invention may be applied and the flexibility of designing and carrying out software utilities and tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method, in a computer system, for generating metadata based upon data contained within image information provided by an image capture device, the image information including image data suitable for processing by an image display application program to render a displayed image, the method comprising:
   acquiring, by a data transfer interface, image information responsive to a request to acquire image data;
   analyzing, by an image data analysis component associated with an image acquisition service, the acquired image information to render at least one new metadata value for the image information;
   integrating the at least one new metadata value with the acquired image information, wherein integrating comprises adding the at least one new metadata value to an acquired image file;
   receiving a request to acquire image data, wherein the image data is rendered by an image capture device; and
   forwarding the request to acquire image data to the data transfer interface.

2. The method of claim 1 wherein the integrating step is carried out prior to providing the image information to a user-mode process that issued the request to acquire image data.

3. A tangible computer-readable medium including computer-executable instructions for facilitating the generation of metadata based upon data contained within image information provided by an image capture device, the image information including image data suitable for processing by an image display application program to render a displayed image, the computer executable instructions facilitating performing a set of steps comprising:
   invoking acquisition, by a data transfer interface, of image information in response to a request to acquire image data;
   analyzing, by an image data analysis component associated with an image acquisition service, the acquired image information to render at least one new metadata value for the image information, wherein it the at least one new metadata value can be associated with one of a number of different property types;
   integrating the at least one new metadata value with the acquired image information;
   receiving a request to acquire image data, wherein the image data is rendered by an image capture device; and
   forwarding the request to acquire image data to the data transfer interface.

4. The computer-readable medium of claim 3 wherein the executable instructions are arranged such that the integrating step is carried out prior to providing the image information to a user-mode process that issued the request to acquire image data.

5. The computer-readable medium of claim 3 wherein the image data analysis component resides within an operating system of the computer system.

* * * * *